(12) United States Patent
Hamadate

(10) Patent No.: US 9,930,286 B2
(45) Date of Patent: Mar. 27, 2018

(54) DISPLAY APPARATUS

(71) Applicants: Kabushiki Kaisha Toshiba, Minato-ku, Tokyo (JP); Toshiba Lifestyle Products & Services Corporation, Ome-shi, Tokyo (JP)

(72) Inventor: Shunichi Hamadate, Ome Tokyo (JP)

(73) Assignees: Kabushiki Kaisha Toshiba, Tokyo (JP); Toshiba Visual Solutions Corporation, Misawa-Shi, Aomori (JP)

(*) Notice: Subject to any disclaimer, the term of this patent is extended or adjusted under 35 U.S.C. 154(b) by 307 days.

(21) Appl. No.: 14/801,200

(22) Filed: Jul. 16, 2015

(65) Prior Publication Data

US 2015/0326816 A1 Nov. 12, 2015

Related U.S. Application Data

(63) Continuation of application No. 14/467,999, filed on Aug. 25, 2014, now abandoned.

(30) Foreign Application Priority Data

Dec. 5, 2013 (JP) .................. 2013-251797

(51) Int. Cl.
*H04R 1/02* (2006.01)
*H04N 5/64* (2006.01)
(Continued)

(52) U.S. Cl.
CPC ............. *H04N 5/642* (2013.01); *H04R 1/028* (2013.01); *H04R 1/345* (2013.01); *H04R 5/02* (2013.01); *H04R 2499/15* (2013.01)

(58) Field of Classification Search
CPC . H04R 5/02; H04R 1/02; H04R 1/105; H04R 1/08; H04R 1/025; H04R 1/026
(Continued)

(56) References Cited

U.S. PATENT DOCUMENTS 6,324,052 B1 * 11/2001 Azima .................. G06F 1/1616
381/306
6,758,303 B2 7/2004 Zurek et al.
(Continued)

FOREIGN PATENT DOCUMENTS

JP H11-331733 A 11/1999
JP 2005-100312 A 4/2005
(Continued)

OTHER PUBLICATIONS

First Office Action mailed by Japan Patent Office dated May 17, 2016 in the corresponding Japanese patent application No. 2013-251797—7 pages.

*Primary Examiner* — Suhan Ni
(74) *Attorney, Agent, or Firm* — Knobbe, Martens, Olson & Bear, LLP

(57) ABSTRACT

According to one embodiment, a display apparatus includes an enclosure having a display portion and an internal space, and a speaker accommodated in the internal space and having a sound emitting surface directed in an opposite direction of the display portion. The enclosure includes a first opening area configured to emit sound of the speaker in the opposite direction of the display portion, and a second opening area configured to emit the sound of the speaker in a lateral direction to the display portion. A volume of the sound emitted from the first opening area is greater than a volume of the sound emitted from the second opening area.

10 Claims, 5 Drawing Sheets

(51) Int. Cl.
*H04R 1/34* (2006.01)
*H04R 5/02* (2006.01)
(58) Field of Classification Search
USPC .................................. 381/306, 333, 365, 388
See application file for complete search history.

(56) References Cited

U.S. PATENT DOCUMENTS

| | | |
|---|---|---|
| 7,630,491 B1 | 12/2009 | Uyehara |
| 2013/0279730 A1 | 10/2013 | Tanaka |

FOREIGN PATENT DOCUMENTS

| | | |
|---|---|---|
| JP | 2008-085661 A | 4/2008 |
| JP | 2012-156987 A | 8/2012 |
| WO | WO 2012/093581 A1 | 7/2012 |

* cited by examiner

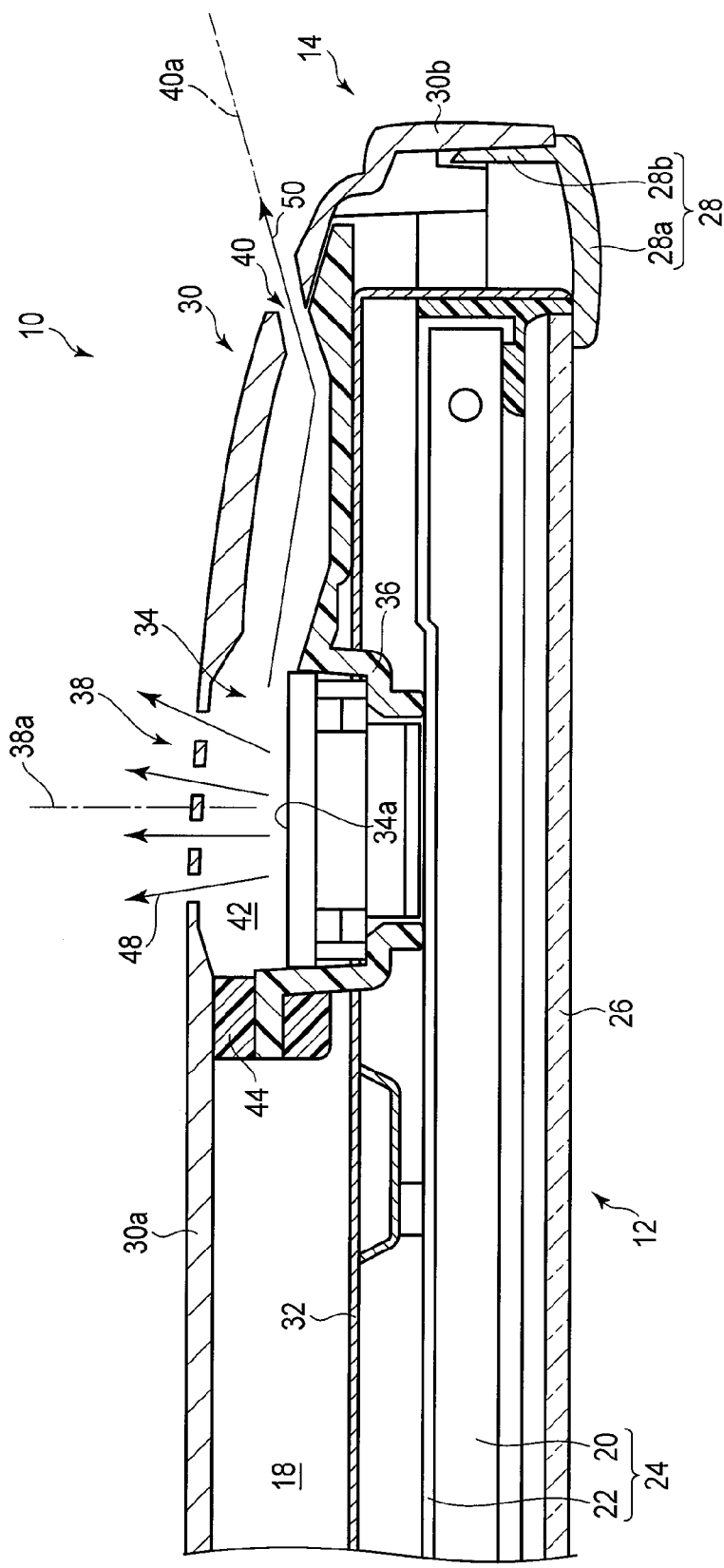
F I G. 2

DISPLAY APPARATUS

CROSS-REFERENCE TO RELATED APPLICATIONS

This application is a continuation of U.S. patent application Ser. No. 14/467,999 filed Aug. 25, 2014 which is based upon and claims the benefit of priority from Japanese Patent Application No. 2013-251797, filed Dec. 5, 2013, the entire contents of each of which are incorporated herein by reference.

FIELD

Embodiments described herein relate generally to a display apparatus with a built-in speaker.

BACKGROUND

In some flat and lightweight display apparatuses such as wall-hung TVs, sound produced by a speaker is emitted in a downward direction and a horizontal direction. For example, see Jpn. Pat. Appln. KOKAI Publication No. 2012-156987.

Such display apparatuses are required to achieve expansive and clear sound quality by a speaker having a small output.

According to one of the embodiments, a display apparatus comprises an enclosure having a display portion and an internal space, and a speaker accommodated in the internal space and having a sound emitting surface directed in the opposite direction of the display portion. The enclosure comprises a first opening area configured to emit sound from the speaker in the opposite direction of the display portion, and a second opening area configured to emit sound from the speaker in a lateral direction to the display portion. The volume of the sound emitted from the first opening area is greater than the volume of the sound emitted from the second opening area.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a cross-sectional view seen along line II-II of FIG. 1;

DETAILED DESCRIPTION

Figure 1:
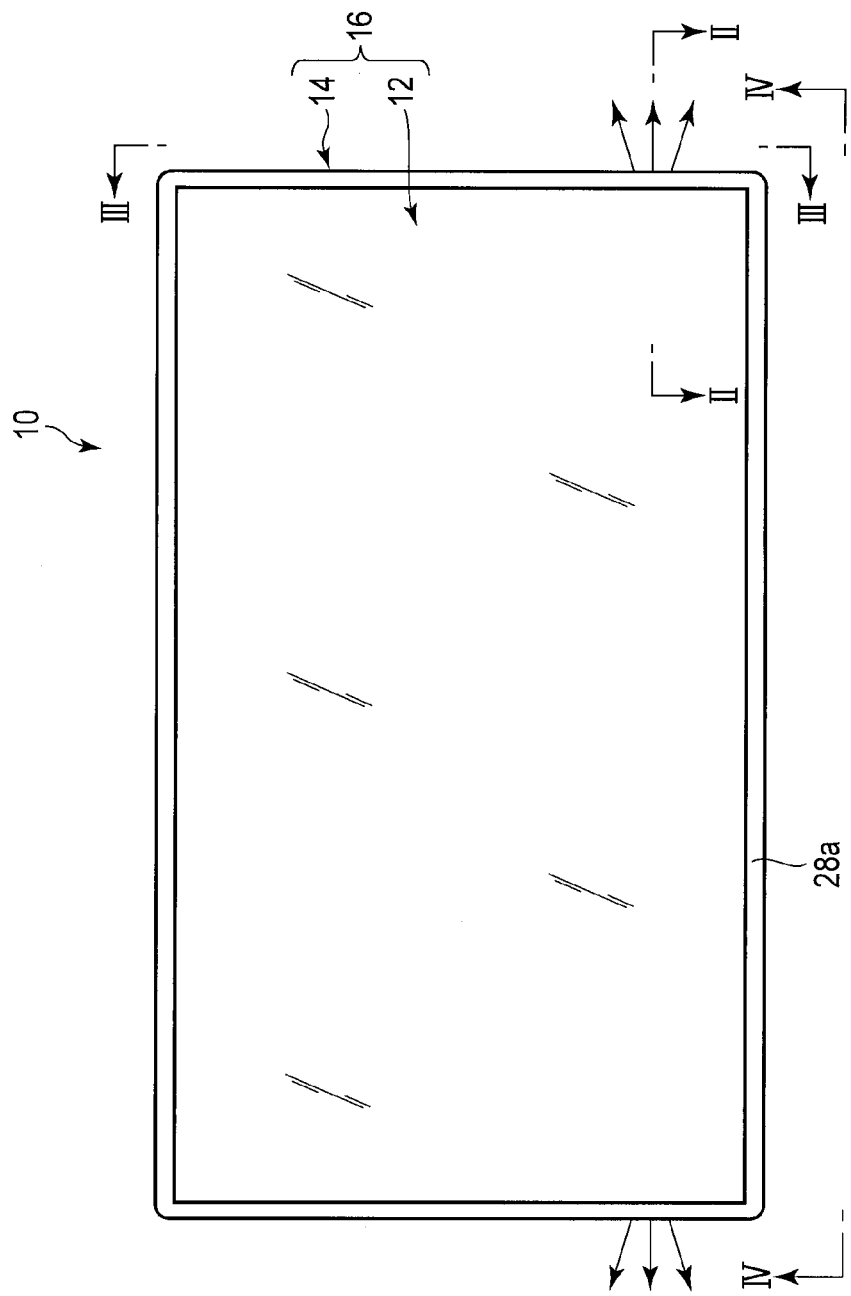
FIG. 1 is a front view showing a display apparatus according to an embodiment.

Various embodiments will be described hereinafter with reference to the accompanying drawings. In the drawings, the same portions are represented by the same reference numerals.

As shown in FIG. 1, a display apparatus 10 according to one of the embodiments is entirely formed in a horizontally elongated rectangular shape. The display apparatus 10 comprises an enclosure 16 constituted by a display portion 12 arranged in a front side, which is the user's side, and a cabinet portion 14 which supports the display portion 12 from the back. An internal space 18 (FIG. 2) is formed inside the enclosure 16.

As an internal structure is schematically shown in FIG. 2, a display module 24 comprising a display panel 20 and a chassis 22 formed of a lightweight metal such as aluminum and arranged in a horizontally outward portion and a back portion of the display panel 20 is provided in the display portion 12. The display panel 20 is formed by the display module 24. A front surface forming a display surface of the display panel 20 is covered with a transparent glass plate 26. The display surface of the display panel 20 is thereby visible from the outside and protected from a surrounding environment. The display panel 20 can be formed of, for example, a tabular liquid crystal panel. The display panel 20 may also be formed of various types of display panel such as a plasma display panel and an organic EL panel.

In the display portion 12, the display module 24 is integrally supported together with the glass plate 26 by the cabinet portion 14. The cabinet portion 14 comprises a front bezel 28 and a back cover 30. The front bezel 28 has a substantially L-shaped cross section formed by a front plate portion 28a abutting on an outer periphery of the glass plate 26 and a side plate portion 28b extending from an outer edge of the front plate portion 28a to a back surface side. The front bezel 28 is integrally connected to the back cover through the side plate portion 28b.

The front plate portion 28a of the front bezel 28 covers an entire outer periphery of the display portion 12. The width of the front plate portion 28a, i.e., the dimension between the inner periphery on a side of the glass plate 26 and the outer periphery on the external side is formed to be exceedingly less than the width of the display panel 20. Openings, switches, etc., are not provided on the front plate portion 28a. The front plate portion 28a has an approximately constant width along with a short side portion in a vertical direction and a long side portion in a horizontal direction as seen from a front face of the user's side. The front plate portion 28a has a curved cross section such that a middle region between the inner periphery and the outer periphery slightly protrudes ahead. The side plate portion 28b is formed to be thinner than the front plate portion 28a to reduce weight.

The back cover 30 comprises a flat back plate portion 30a positioned at the back of the display module 24 and a side plate portion 30b extending from an outer periphery of the back plate portion 30a. The side plate portion 30b is fixed on an outer surface of the side plate portion 28b of the front bezel 28. This provides a strong integral structure of the enclosure 16 and protects various electronic components arranged inside the internal space 18.

Various necessary boards such as a control board connected to the display panel 20 to control the entire display apparatus 10, a power supply circuit board, a circuit board for driving a speaker to be described later, etc., and electronic components are arranged in the internal space 18 defined between the display module 24 and the cabinet portion 14. These various boards can be held in the internal space 18 by the chassis 22 of the display module 24 directly or through variously formed supplemental brackets 32. The supplemental brackets 32 should be preferably formed of metal or appropriate engineering plastic, etc., to achieve reduction in weight and size.

A pair of right and left speakers 34 is arranged in the internal space 18. In the present embodiment, the pair of speakers 34 is arranged below, i.e., on a side adjacent to a lower long side portion, in positions which are bilaterally symmetrical when seen from the front side (viewer's side) in FIG. 1. Each of the speakers 34 is attached to the chassis 22 of the display module 24 by a supporting member 36 for fixing as shown in FIG. 2.

Each of the speakers 34 is held to be opposite to an inner surface of the back plate portion 30a in a state in which a sound emitting surface 34a for emitting sound is directed in a direction of a back surface of the display apparatus 10, i.e., the back plate portion 30a of the back cover 30. The sound emitting surface 34a is preferably arranged approximately parallel to the display panel 20 such that the maximal thickness of the entire display apparatus 10, i.e., the distance between the front plate portion 28a of the front bezel 28 and the back plate portion 30a of the back cover 30 is reduced. Furthermore, the width of the front bezel 28 or the dimension of the entire display apparatus 10 in the horizontal direction can be reduced by arranging the speakers 34 on the side of the back surface of the display module 24 in a position in which the speakers 34 overlap the display module 24.

A pair of a first opening area 38 and a second opening area 40 is formed on the back plate portion 30a of the back cover 30 to emit sound produced by each speaker 34 from the interior space 18 to the outside of the enclosure 16. The first opening area 38 is arranged in a position which is opposite to the sound emitting surface 34a of the speaker 34 and which overlaps the sound emitting surface 34a in a front-back direction. The second opening area 40 is arranged in a position deviated from the sound emitting surface 34a and adjacent to the side plate portion 30b. The first opening area 38 and the second opening area 40 comprise a plurality of through-holes made through the back cover 30 in a thickness direction.

The first opening area 38 comprises a first axis 38a extending in a direction vertical to the sound emitting surface 34a. The second opening area 40 comprises a second axis 40a extending in a direction intersecting the first axis 38a. The second axis 40a can be extended in an appropriate direction if the second axis 40a can convey sound from the speaker 34 to a lateral side of the enclosure 16. However, the second axis 40a is preferably at an angle at least greater than 45 degrees and less than 90 degrees with respect to the first axis 38a.

The main part of the sound from the speaker 34 passes through the first opening area 38, the rest of the sound passes through the second opening area 40, and the sound is thereby emitted to the outside of the enclosure 16. In other words, the sound emitted from the speaker 34 is distributed such that the sound from the first opening area 38 has a volume or a sound pressure greater than that of the sound from the second opening area 40. To make the volume of the sound emitted from the first opening area 38 greater than that of the sound emitted from the second opening area 40, the opening area of the first opening area 38 in the first axis direction is preferably larger than the opening area of the second opening area 40 in the second axis direction, and, if the intensity level of the sound output from the speaker 34 is represented as 100, the sound emitted from the cabinet portion 14 preferably includes the sound through the first opening area 38 in the range of 60 to 80 intensity levels and the sound through the second opening area in the range of 20 to 40 intensity levels.

A partition 44 adjacent to the sound emitting surface 34a of each of the speakers 34 and configured to partition a sound emitting portion 42 communicating with the first opening area 38 and the second opening area 40 is provided in the interior space 18 of the enclosure 16. The partition 44 partitions the sound emitting portion 42 by contacting the inner surface of the back plate portion 30a along the supporting member 36 of the speaker 34, and prevent sound from escaping from the sound emitting portion 42 to the other portion in the interior space 18. The partition 44 can be formed of an appropriate material capable of preventing sound from escaping from the sound emitting portion 42 to the adjacent area in the interior space 18, and is preferably formed of an elastic material such as a rubber material. In addition, the sound emitting portion 42 itself can be formed of a foaming resin, etc., by arranging a thin-film material, etc., which prevents sound absorption on a side facing the sound emitting portion 42.

Figure 3:
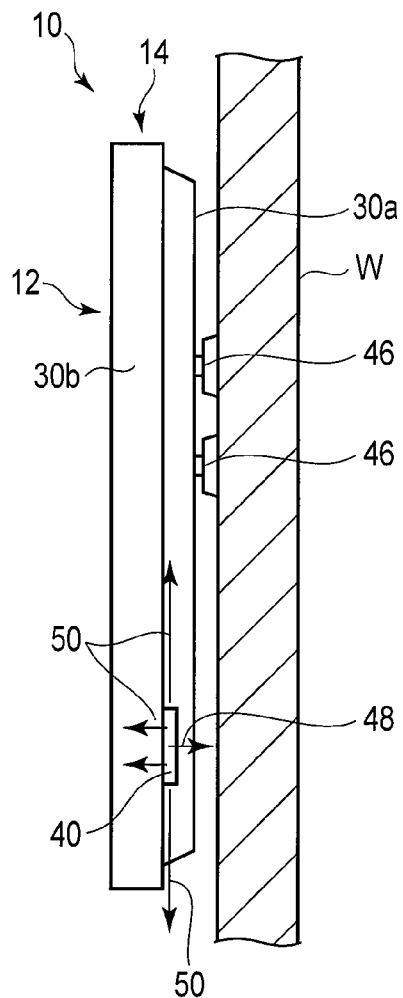
FIG. 3 is an explanatory drawing showing the display apparatus mounted on a wall surface from the direction of line III-III of FIG. 1.
Figure 4:
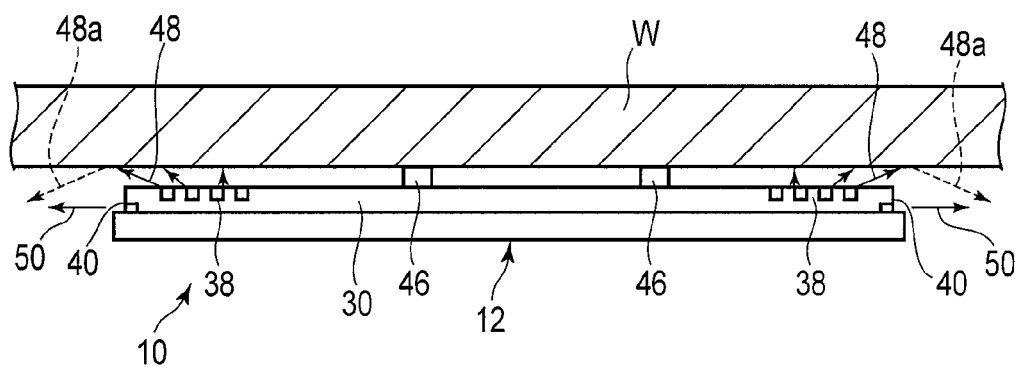
FIG. 4 is an explanatory drawing showing the display apparatus mounted on the wall surface from the direction of line IV-IV of FIG. 1.
Figure 5:
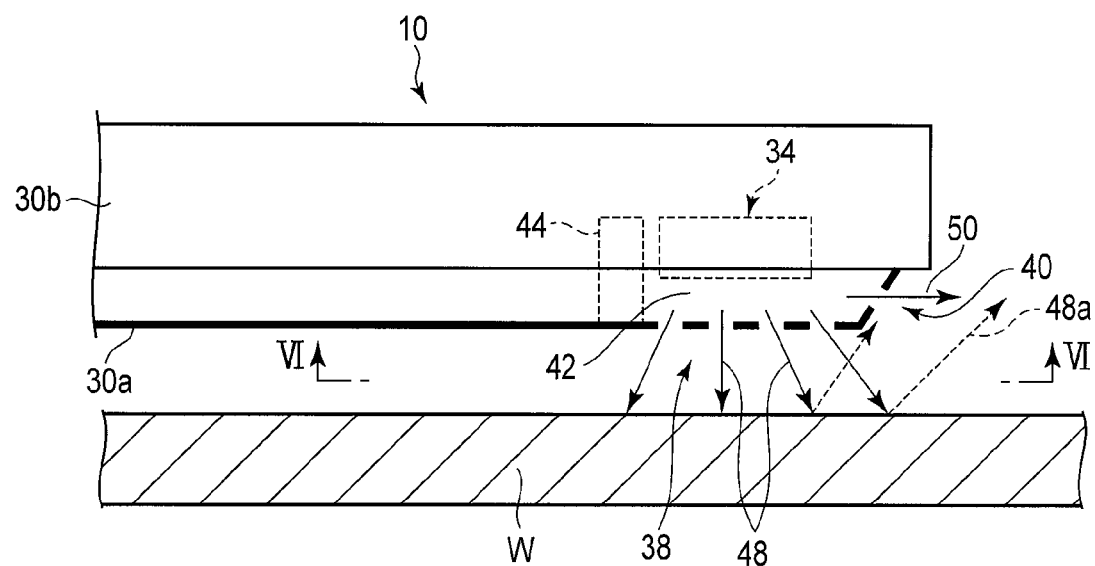
FIG. 5 is an enlarged explanatory drawing showing a part of FIG. 4.

As shown in FIG. 3 to FIG. 5, the display apparatus 10 entirely has a flat structure and can be used as, for example, an electronic display apparatus capable of being hung on a wall W, etc., by an mounting fixture 46, displaying an image on the display portion 12 and outputting sound from the speakers 34. For example, images and characters can be displayed on the display portion 12 and sound such as music and speech can be output from the pair of built-in speakers 34 based on signals received from a communication terminal, a personal computer, etc., by wire or wireless means. The display apparatus 10 can also be used for various purposes. For example, the display apparatus 10 can be used as a tablet type portable computer by incorporating a required operating system or used as a digital terrestrial TV receiver. The power may be supplied from a built-in battery or from an external power source via a power supply cable.

As shown in FIG. 5, when the display apparatus 10 is attached to the wall W, the sound produced by the speaker 34 is emitted from the sound emitting surface 34a to the sound emitting portion 42, and output from the first opening area 38 and the second opening area 40 to the outside of the enclosure 16. Sound 48 output from the first opening area 38 is reflected off the wall W and emitted to the front surface side of the display apparatus 10 as reference numeral 48a represents. At this time, sound 50 is also emitted from the second opening area 40 to the lateral direction of the display apparatus 10.

The sound 48a output from the first opening area 38 and reflected off the wall W and the sound 50 output from the second opening area 40 can be thereby balanced and an expansive sound setting and clearness of the sound can be minutely adjusted.

Figure 6:
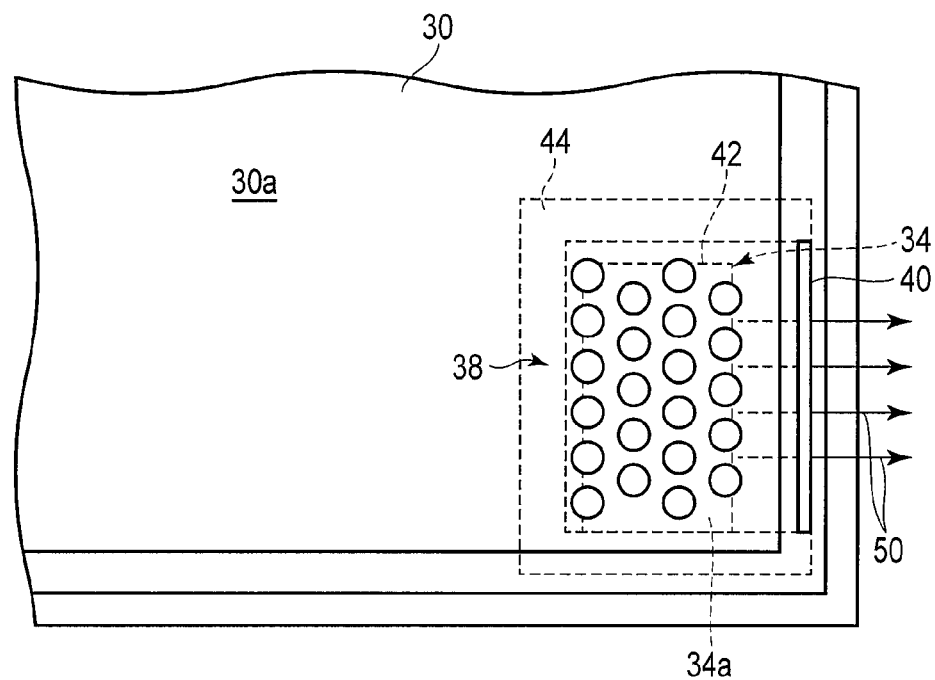
FIG. 6 is an explanatory drawing seen from the direction of line VI-VI of FIG. 5.

FIG. 6 shows a state of the first opening area 38 and the second opening area 40 which are configured to balance the sound, in which the first opening area 38 comprise a number of circular punch holes and the second opening area 40 is formed as a vertically extending elongated slit. Of course, the opening areas are not limited to this shape, but can be formed in an appropriate shape if the sound 48 output from the first opening area 38 along the first axis 38a and the sound 50 output from the second opening area 40 in the second axis direction can be balanced. For example, the first opening area 38 can be formed as a slit or a rectangle and the second opening area 40 may be formed of punch holes.

Figure 7:
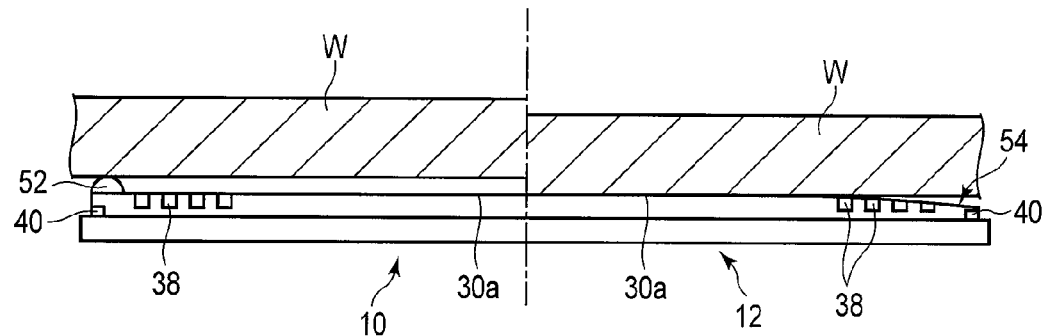
FIG. 7 is an explanatory drawing showing two examples of arrangement of the display apparatus on the wall surface.

FIG. 7 shows examples of structure to prevent the first opening area 38 from being blocked by the wall W. On the left side of FIG. 7, a back surface of the back plate portion 30a of the back cover 30, i.e., a surface opposite to the wall W is formed flat, and one or more projections 52 are projected from the back surface. On the right side of FIG. 7, a central region of the back surface of the back plate portion 30b is formed flat, and a side edge region on which the first opening area 38 is formed is formed as an inclined surface 54 which inclines from the central region to the side of the display portion 12. In each of the cases, an expansive sound can be conveyed from the side surface of the display apparatus 10 to the outside after the sound output from the first opening area 38 is reflected off the wall W.

Figure 8:
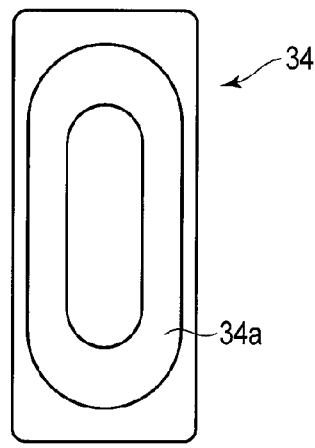
FIG. 8 is an explanatory drawing of a speaker.

FIG. 8 exemplifies a shape of the sound emitting surface 34a of the speaker 34. As shown in FIG. 8, the sound emitting surface 34a of the speaker 34 is formed in an oblong or ellipsoidal shape such that a long axis side of the oblong or ellipsoidal shape can be arranged along the vertical direction and the entire sound emitting surface 34a can be arranged to be close to the lateral side portion of the display apparatus 10. In this case, the sound from the first opening area 38 and the sound from the second opening area 40 can be balanced even if the size of the display portion 12 or the enclosure 16 is larger.

Figures 9A, 9B:
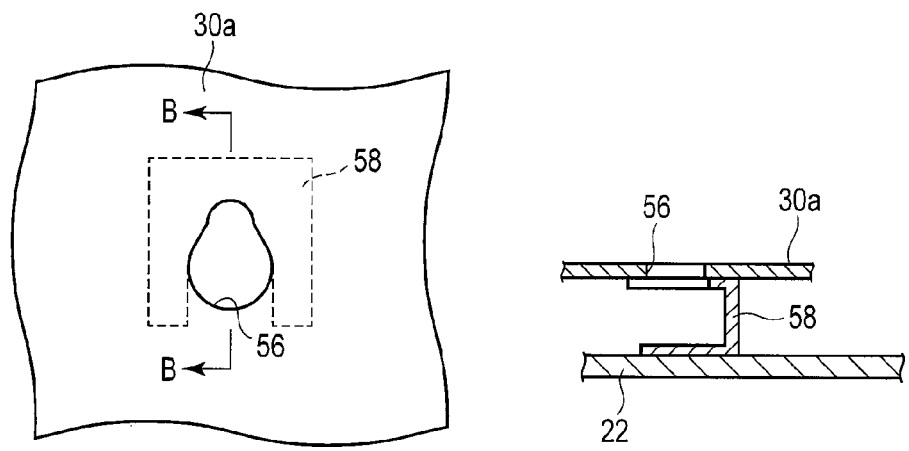
FIG. 9A is an explanatory drawing showing a mounting portion against the wall surface from a back surface side.
FIG. 9B is a schematic cross-sectional view taken through line B-B of FIG. 9A.

As shown in FIG. 9A and FIG. 9B, a mounting hole 56 comprising a small diameter portion and a large diameter portion may be arranged in the back plate portion 30a of the back cover 30. A supplemental fixture 58 for reinforcing the mounting hole 56 can be fixed to a structural member such as the chassis 22. The mounting fixture 46 can thereby be attached through the mounting hole 56 and detachably fixed to the wall W. For example, four mounting holes 56 are preferably formed in the back surface of the display apparatus 10.

Since at least the central region of the back cover 30 is formed flat, the display apparatus 10 can be laid on a desk, etc., with the back face directly touching the desk without using the mounting fixture 46. In this case, too, the sound output from the first opening area 38 can be reflected off the top surface of the desk, emitted as the reflected sound 48a, and balanced with the sound 50 from the second opening area 40. If the display apparatus 10 is hung on the wall W, the lower edge of the enclosure 16 may be supported not by the mounting hole 56 and the mounting fixture 46, but by an appropriate supporting arm.

In the display apparatus 10 of the embodiment, expansive and clear sound quality can be achieved even if the output of the speaker 34 is small.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display apparatus comprising:
   a display panel;
   a circuit board electrically connected to the display panel, and configured to control the display panel;
   a speaker;
   a front bezel covering an entire outer periphery of the display panel; and
   a back cover located at a back surface of the display panel and connected to the front bezel, the back cover covering the circuit board and the speaker,
   wherein the back cover comprises:
   a first opening area including a first through-hole arranged in a position facing a sound emitting surface of the speaker facing a first direction with respect to a display surface of the display panel, the first through-hole allowing a sound of the speaker to be conveyed through to outside; and
   a second opening area including a second through-hole facing a second direction with respect to the display surface of the display panel, and being arranged in a position different from the first opening area, the second through-hole allowing a sound of the speaker to be conveyed through to the outside, and
   wherein the first through-hole comprises one or more holes of an arbitrary shape, and the second through-hole comprises one or more holes of an arbitrary shape, and
   an opening area of the first through-hole of the first opening area is larger than an opening area of the second through-hole of the second opening area.

2. The apparatus of claim 1, wherein
   a volume of the sound conveyed through the first through-hole to the outside is larger than a volume of the sound conveyed through the second through-hole to the outside.

3. The apparatus of claim 1, wherein
   the second direction has an angle greater than 45 degrees and less than 90 degrees with respect to the first direction.

4. The apparatus of claim 1, wherein
   a size of the hole which constitutes the first through-hole is an arbitrary size, and a size of the hole which constitutes the second through-hole is an arbitrary size.

5. The apparatus of claim 1, wherein the speaker comprises a pair of speaker units, the first opening area comprises a pair of first openings, and the second opening area comprises a pair of second openings.

6. A display apparatus comprising:
   a display panel;
   a circuit board electrically connected to the display panel, and configured to control the display panel;
   a speaker;
   a front bezel covering an entire outer periphery of the display panel; and
   a back cover located at a back surface of the display panel and connected to the front bezel, the back cover covering the circuit board and the speaker,
   wherein the back cover comprises:
   a first opening area including a first through-hole arranged in a position facing a sound emitting surface of the speaker facing a first direction with respect to a display surface of the display panel, the first through-hole allowing a sound of the speaker to be conveyed through to outside; and
   a second opening area including a second through-hole facing a second direction with respect to the display surface of the display panel, and being arranged in a position different from the first opening area, the second through-hole allowing a sound of the speaker to be conveyed through to the outside, and wherein the first opening area and the sound emitting surface are arranged at positions at least having portions facing each other, the first through-hole comprises one or more holes of an arbitrary shape, and the second through-hole comprises one or more holes of an arbitrary shape, and an opening area of the first through-hole of the first opening area is larger than an opening area of the second through-hole of the second opening area.

7. The apparatus of claim 6, wherein
a volume of the sound conveyed through the first through-hole to the outside is larger than a volume of the sound conveyed through the second through-hole to the outside.

8. The apparatus of claim 6, wherein
the second direction has an angle greater than 45 degrees and less than 90 degrees with respect to the first direction.

9. The apparatus of claim 6, wherein
a size of the hole which constitutes the first through-hole is an arbitrary size, and a size of the hole which constitutes the second through-hole is an arbitrary size.

10. The apparatus of claim 6, wherein
the speaker comprises a pair of speaker units, the first opening area comprises a pair of first openings, and the second opening area comprises a pair of second openings.

* * * * *